R. S. O'NEIL.
STOP VALVE.
APPLICATION FILED DEC. 26, 1917.

1,302,990.

Patented May 6, 1919.

Inventor:-
Rodolph S. O'Neil
By:- B. Singer, Atty.

UNITED STATES PATENT OFFICE.

RODOLPH STUART O'NEIL, OF LONDON, ENGLAND.

STOP-VALVE.

1,302,990.

Specification of Letters Patent.

Patented May 6, 1919.

Application filed December 26, 1917. Serial No. 208,949.

*To all whom it may concern:*

Be it known that I, RODOLPH STUART O'NEIL, a subject of the King of Great Britain, and resident of London, England, have invented certain new and useful Improvements in Stop-Valves, of which the following is a specification.

This invention relates to improvements in and connected with stop valves which are particularly applicable for use in connection with steam engines. The invention has reference to stop valves provided with sealing valve collars adapted to shut off steam from the stuffing box when the valve proper is open so that repairs can be effected without stopping the engine. Such arrangements have not proved satisfactory in practice because the steam invariably leaks past the valve collar to the packing and even a small quantity of steam renders the effective packing of the valve impossible. Hitherto although it has been proposed to provide such valves with a test cock in communication with a point on the valve stem between the valve like collar and the stuffing box—through which a small quantity of the leakage would escape—for the purpose of ascertaining if the valve like collar is properly seated, no practical means has been proposed for permitting the leakage to have free access to the atmosphere so that the valve can be repacked in spite of the leakage past the valve like collar. According to my invention I provide, in addition to the valve like collar, means whereby any steam leaking past the valve like collar has free access through a passage provided for the purpose and does not get to the packing at all. This involves essentially providing an annular chamber between the valve like collar and the back bush or gland of the stuffing box and a passage leading from this chamber to the atmosphere. By this means the stuffing box may be cut off from the steam while the engine is still working, and such steam as may percolate through the cut off valve collar will have a free exit through the passage, and so have no tendency to exert any pressure upon the packing. The packing may then be replaced or repaired without necessitating the stoppage of the engine. The passage preferably leads to a chamber normally closed by a screw plug and lubricant may be introduced through this chamber and duct to lubricate the valve spindle. This is particularly advantageous where the valve spindle is screw threaded adjacent the valve, but where the valve is of that type where the screw thread is at the upper end of the rod and screws through a bush in a bridge, I provide a separate lubricating device as will hereafter appear.

Figure 1:
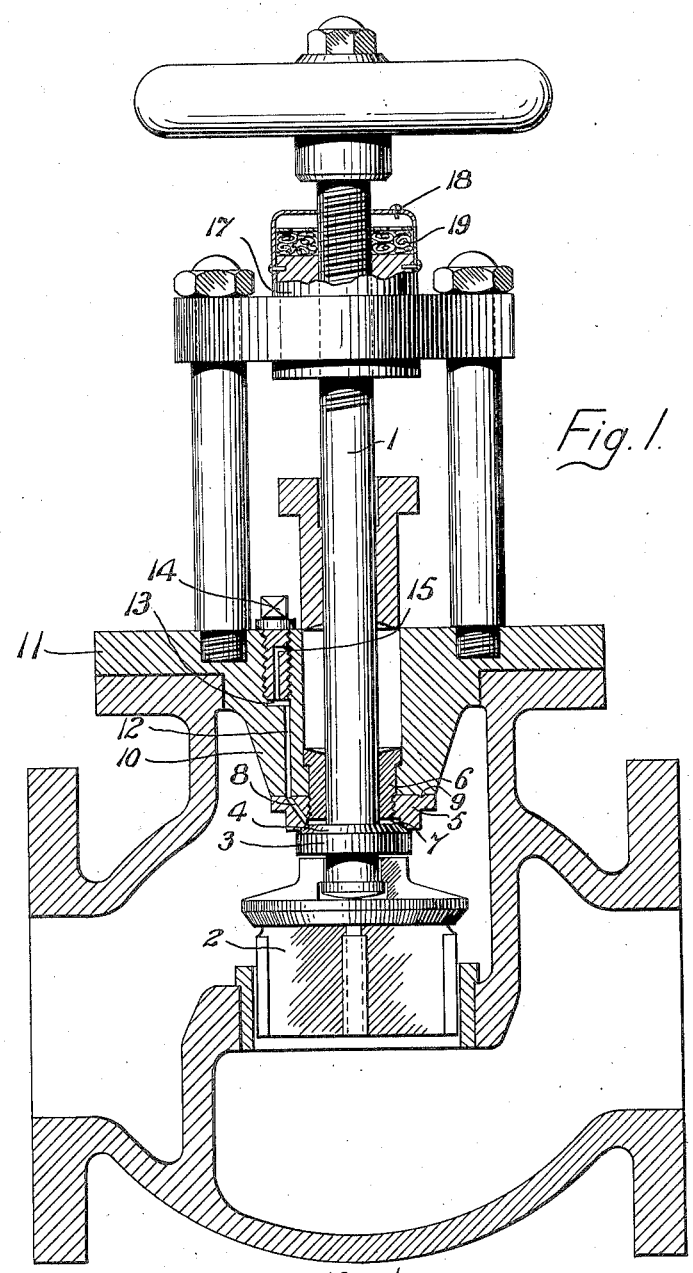
Figure 2:
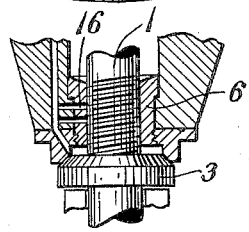

In the accompanying drawings I have illustrated a valve constructed in accordance with the invention, Figure 1 being a vertical section of a valve having a spindle adapted to screw through a bridge, while Fig. 2 is a view illustrating the arrangement for insuring lubrication of the screw threads of the valve rod or spindle when such valve rod screws through the lower gland of the stuffing box.

Referring to Fig. 1 of these drawings the numeral 1 designates the valve rod of any suitable form of stop valve 2, and this rod 1 is provided with a collar 3 having a conical seating face 4, adapted to register with a conical face on a ring member 5 which is screwed on to the projecting end of the back or lower bush or gland 6, and this ring 5 is such that an annular space 7 is left around the rod at the bottom of the back bush or gland 6 of the stuffing box. A duct 8 in the ring 5 leads from this space to an annular space 9 in the top surface of the ring 5, which surface lies flush with a boss 10 on the stop valve cover plate 11. A duct 12 in the cover plate registers with the annular groove or ridge in the ring and terminates in an enlarged internally screwed portion 13 in which a headed screw-threaded plug 14 having a right angled bore 15 is adapted to screw. This plug 14 may be screwed up or down at will to cause its duct to communicate or not with the atmosphere. By this means the annular space 7 surrounding the valve rod 1 at the bottom of the back bush 6 of the stuffing box may be put into communication with the atmosphere at will. In operation the device functions as follows:—To repack the valve the valve rod will be adjusted to open the valve 2 fully and thus seat the collar 3 tightly on the ring member 5. The plug 14 aforesaid will then be manipulated to open the bore 15 aforesaid to the atmosphere, so that any steam which may percolate past the collar 3 will escape by way of the ducts 8 and 12 and bore 15 in the plug 14 and exert no pressure upon the packing. The packing may then be attended to without difficulty.

Should any dirt or grit collect on the face of the collar 3 which might prevent it seating itself closely, this may be removed by seating the said collar 3 on its seat, thus scraping its face 4 against the ring member 5, and steam may be then blown through to complete the cleaning operation. If after the valve has been packed, oil or other suitable lubricant is introduced into the duct and the plug then screwed up, the valve spindle will be effectively lubricated, the oil percolating to the annular space 7 surrounding the end of the valve rod or spindle 1. This system of lubricating the valve rod or spindle will be found particularly advantageous where the valve spindle is screw-threaded at that part as shown in Fig. 2, and in this case transverse bores 16 may be provided in the bush or gland 6. Where the valve rod or spindle screws through a bridge at the upper end as shown in Fig. 1, I propose to provide a lubricant containing box 17 adapted to be filled through an opening 18, and this container is provided with an absorbent packing 19 to which the lubricant has free access. It will be appreciated that the operation of the valve will insure this packing wiping the screw threads and thus keeping them clean and well lubricated.

What I claim and desire to secure by Letters Patent is:—

1. A stop valve comprising a valve, a collar adapted to seat itself upon a removable seating ring carried upon the end of the lower or back bush or gland of the stuffing box when the valve is fully open, a duct in the seating ring leading from an annular space surrounding the lower end of the valve rod or spindle to an annular ridge upon the surface of the seating ring, a duct in the valve cover plate leading from the annular ridge to a tapped opening in the valve cover plate, and a screw threaded plug adapted to be screwed into the tapped opening aforesaid substantially as specified.

2. A stop valve as set forth in claim 1 wherein the screw threaded plug adapted to screw into the screw threaded opening in the valve cover plate is provided with a right angled passage whereby the partial unscrewing of the plug establishes communication between the annular space surrounding the end of the valve spindle and the atmosphere substantially as specified.

3. A stop valve having a valve-like collar adapted to shut off the valve stuffing box from the pressure fluid when the valve is fully open, a chamber alined with the collar and interposed between it and the stuffing box, a valve spindle for said valve, a valve cover plate, and ducts connecting the chamber with a top opening in said plate, and lubricant conducting passages leading from the ducts in said plate through the bush or gland in the stuffing box.

In testimony whereof I affix my signature.

RODOLPH STUART O'NEIL.